Jan. 2, 1968     H. R. KUKAWSKI     3,361,246
ARTICLE ALIGNING DEVICE
Filed Sept. 1, 1966     2 Sheets-Sheet 1
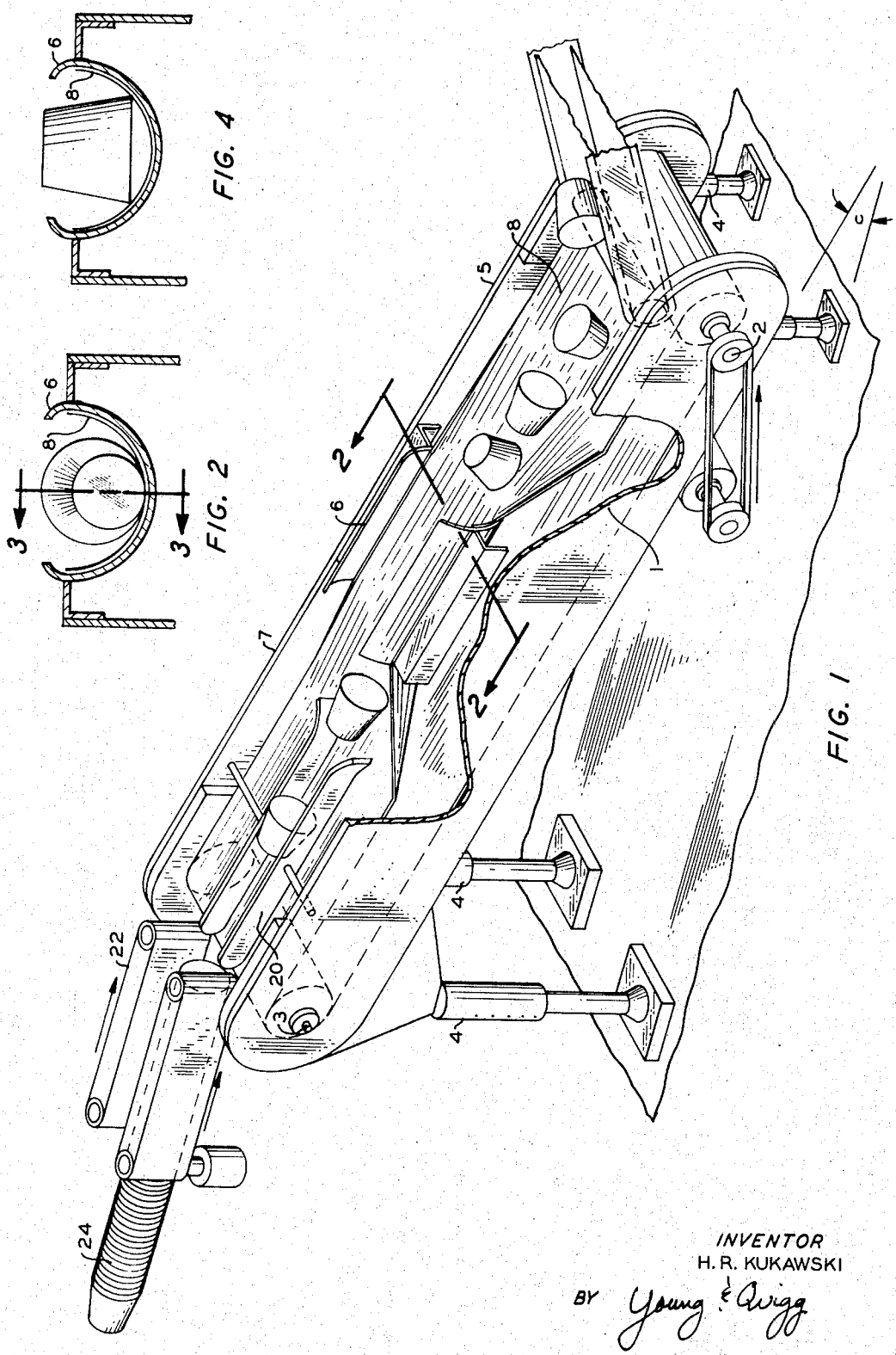
INVENTOR
H. R. KUKAWSKI
BY *Young & Quigg*
ATTORNEYS

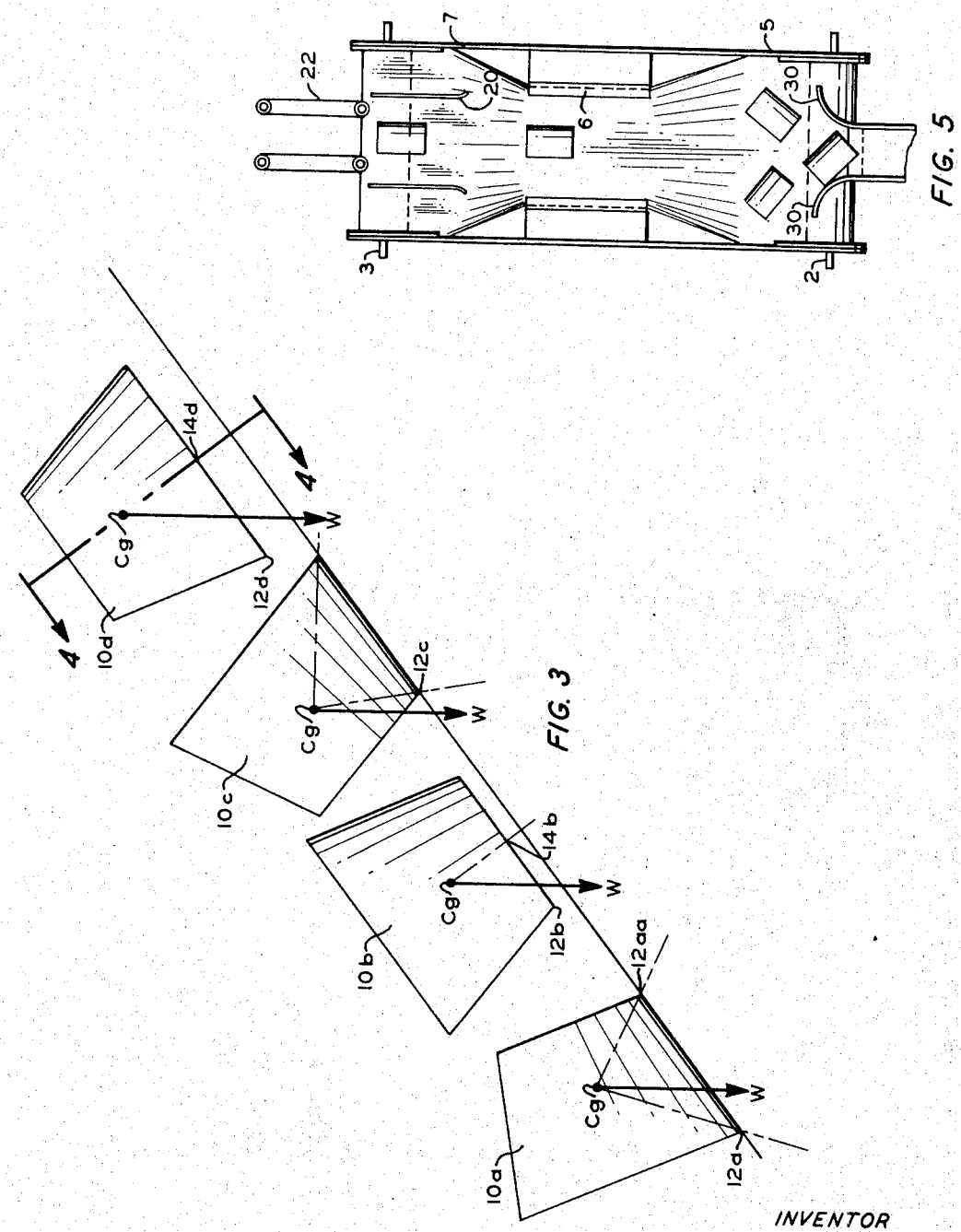

United States Patent Office 3,361,246
Patented Jan. 2, 1968

3,361,246
ARTICLE ALIGNING DEVICE
Henry R. Kukawski, Los Angeles, Calif., assignor to Phillips Petroleum Company, a corporation of Delaware
Filed Sept. 1, 1966, Ser. No. 576,756
7 Claims. (Cl. 198—33)

ABSTRACT OF THE DISCLOSURE

Articles, such as frusto-conically shaped containers, are aligned by passing the articles up an inclined plane which has a U-shaped channel which raises the article off its base. The angle of the plane is adusted such that the article is unstable in all positions except one position, especially when in the U-shaped channel.

This invention relates to article aligning devices. One of its aspects relates to a method for aligning a symmetrical generally cylindrical or frusto-conically shaped article in which the article is passed to an inclined plane, the article is moved up the inclined plane, the article is passed through a zone on the inclined plane, in which zone the article is unstable in all positions except one.

In another of its aspects the invention relates to an apparatus for aligning non-regular articles, the apparatus comprising an inclined plane, a flexible conveyor belt, means for moving the belt from bottom to top of the plane, a channel means in the central portion of the plane, planes for forming the belt into a channel member, the channel at the lowermost portion being no larger than the smallest side of the article, the inclined plane being at such an angle that the article when passed through the channel means will be unstable in all positions except one.

Thermoformed containers have become popular for use of food products and the like. It is desirable to fill the containers in a continuous operation. The continuous operation requires that each container be placed in the proper position on a conveyor belt, for example. As is well known by one skilled in the art, containers formed in a continuous operation must be stacked for shipment to the filling station.

The unscrambling operation requires that the containers be fed to a stacking operation in a predetermined position, for example, open end downward. This job can be done manually but an understood by one skilled in the art is expensive.

I have now conceived of a simple device which will align containers in the same position in a stack, open end downward, regardless of the position in which the containers are received.

It is an object of this invention to provide a method and apparatus for aligning scrambled containers into a stack for shipping.

It is a further object of this invention to provide a method and apparatus for aligning non-regular articles in the same position from a group of said articles in non-aligned condition.

It is a still further object of this invention to provide a method and apparatus for rotating 180° tapered containers whereby the containers are not rotated if aligned in a first direction but are rotated if aligned in a second direction.

Other aspects, objects, and the several advantages of this invention are apparent to one skilled in the art from a study of this disclosure, the drawings, and the appended claims.

According to the invention there is provided a simple ramp in which a plurality of articles are aligned. The articles are placed on the bottom of the ramp and are carried up the ramp by a flexible conveyor belt. As the articles reach the central portion of the ramp, the belt is forced into a channel-like configuration. In a preferred embodiment of the invention, the articles are tapered, frusto-conical containers with the large end being open. The action of the conveyor belt will shift the points of support for the container on the belt to such an extent that the force of gravity on the container will produce an unbalanced torque on the container in rightside up or upside down condition, thereby causing the container to rotate. The angle of the belt is such that if the container faces up the belt, the force of gravity and/or the shape of the container causes the container to rotate so that the container faces down the belt or open end down.

The invention will now be described with reference to the drawings which show an embodiment of the invention as it applies to a frusto-conically shaped container. FIGURE 1 is an axonometric view of an embodiment of the invention; FIGURE 2 is a cross-sectional view of the conveyor shown in FIGURE 1 taken along line 2—2; and FIGURE 3 is a sectional elevation showing the method of rotating the containers on the conveyor. FIGURE 4 is a sectional view through 4—4 of FIGURE 3; and FIGURE 5 shows an embodiment employing means for aligning a cylindrical container.

Referring now to the drawings, there is provided an inclined plane 1 having a conveyor belt 8 which is attached to rollers 2 and 3 and slides over plane 1. The plane 1 is supported by legs 4 which can be adusted to the desired angle. Belt 8 can be powered by a conventional motor means which can be attached to either 3 or 2. The plane is provided with side wall members 5, 6 and 7. The walls at 6 are tapered inwardly thus causing the belt 8 to form a channel on the plane, as can be more clearly seen in FIGURE 2. The aligned articles are passed through conveyor system 22 and into stack 24 which can be horizontally or vertically disposed.

In operation, the containers are fed to the bottom of the belt and can take any one of four positions represented by $10a$, $10b$, $10c$ or $10d$ shown in FIGURE 3. If the containers land so that the open end faces toward the edge of the belt, the angle of incline will cause them to rotate down the plane, rotating in the plane of the belt until they stabilize in the position represented by $10a$. The containers will rotate in the plane of the belt because they are tapered or frusto-conically shaped. If cylindrical containers are unscrambled, a rotating means, such as a pair of curved bars 30, shown in FIGURE 5, could cause rotation of the cylindrical containers as they rolled down the plane.

If the container lands in the position represented by $10a$, the bottom support point $12a$ will be lower on the belt than the line of force, $w$, caused by gravity, which force passes through CG, the center of gravity of the container. As can be seen from FIGURE 3, the moments of force about $12a$ will produce a net clockwise moment which will be countered by the force of the belt against container $10a$ at $12aa$. In this position, the container will be stable and will not rotate.

If the container lands in position $10b$, the bottom point of contact of the container with the belt, point $12b$, will be lower than the line of force passing through CG when the belt is flat. However, when the belt is curved at the edges, it tends to lift the container off the belt similar to that shown in FIGURE 4. This lifting of the container off of the bottom of the belt tends to move the bottom point of contact of the container with the belt from $12b$ toward point $14b$. As soon as the bottom point of contact moves to the right past $w$, the line of force through CG, an unbalanced moment in the counter clockwise direction will result, thereby rotating container $10b$ counterclockwise about the bottom point of contact until it reaches position 10a.

If the container lands in position 10c, the angle of incline of the plane will cause the container to rotate to position 10b, whereupon when it passes through channel portion 6, the container will rotate into position 10a. In position 10c, the lowest point of contact of the container with belt 8, point 12c, will be to the right of the line of force, w, due to gravity acting through the center of gravity, point CG, thereby producing an unbalanced moment in the counter-clockwise direction. Thus, preferably the article to be aligned according to the invention should have a center of gravity which is not in the geometric center of the article. In the preferred embodiment of the invention, the angle of incline should be adjusted so that the article is unstable in position 10c but stable when in position 10a.

The invention, however, is not limited to aligning articles whose center of gravity is eccentric. The invention could operate to align articles whose center of gravity is in the center of the geometric center of the article. If, for example, the article shown in FIGURE 3 had a center of gravity in the geometric center of the article, then, because of its tapered or frusto-conical shape, the article could be caused to rotate in the plane of the belt from position 10c to position 10a.

If the container lands in position 10d, then, as in the case of 10b, point 12b will be lower than the line of force, w, which passes through the center of gravity on a flat belt. When the belt is curved as in 6, seen in FIGURE 4, then the lowest point of contact of the container with the belt shifts from point 12d toward point 14d whereupon the container will rotate counterclockwise into 10c, then to position 10b and finally into position 10a.

Whereas the invention has been described with reference to tapered or frusto-conically shaped containers, it is obvious that other containers not so shaped could be aligned or oriented by the invention. The articles, however, will have a generally circular face if it is desired to rotate the articles by the channel means 6.

Some articles, however, need not be rotated by the channel means. Articles which have an eccentric center of gravity and which are symmetrical about a line such as a cylindrical tube, could be aligned simply by selecting the proper angle of incline for the article.

The angle of incline is also limited by the coefficient of friction between the article and the conveyor belt. The angle of incline must be such that the article will not slip on the belt. Generally, the coefficient of friction must be greater than the tangent of the angle which the plane makes with the horizontal. The coefficient of friction can be adjusted by applying various substances such as polyvinyl chloride and polyvinylidene chloride to the belt and/or articles.

Containers having the following dimensions have been successfully aligned on a belt having an angle of incline between 26 and 47 degrees and a minimum channel width of 8 inches, the channel having semicircular configuration.

|  | Inches |
| --- | --- |
| Height | 3 |
| Maximum diameter | 4⅝ |
| Minimum diameter | 3 9/16 |

As applied to frusto-conically shaped containers, the invention works well with containers whose ratio of height to base radius is in the range of 0.175/1 to 3.464/1, preferably 0.728/1 to 2/1. For such containers, the angle of incline will vary between 5 to 60 degrees, preferably 20 to 45.

The width of the channel means 6 can vary. Generally, the minimum width of the channel must be small enough to raise the container in position 10b to cause the bottom point of contact to shift sufficiently to rotate the article into position 10a. The minimum width of the channel must be larger than the maximum diameter of the container. Thus, the channel width, as the angle of incline of the plane, will depend on the particular dimensions and other characteristics of the container. The term minimum width of the channel is meant to signify the width of the channel at the top portion thereof. Obviously, the width will decrease from the top to the trough as shown in FIGURE 4.

Specific example

An injection molded polyethylene frusto-conically shaped cottage cheese container three inches tall with a 3 9/16 inch diameter bottom and a 4⅝ inch diameter top is dropped from the injection molding machine onto a rubber belt conveyor such as that hereinbefore described. The conveyor is tilted 30 degrees upward from the horizontal. The container falls on the transition section of the belt as it is changing from a flat cross section to a channelled cross section having an approximately semicircular configuration 8 inches in diameter. The coefficient of friction between the polyethylene container and the rubber belt is about 0.84. When on its side, the container's center of gravity is not equidistant from its top supporting edge and its bottom supporting edge. It rolls and tumbles on the belt until it assumes a stable position on its side with its bottom end uppermost on the belt. Then the belt carries it to the upper end of the conveyor where it is engaged by a separate conveying mechanism and moved into a nested relationship with like containers. After a preselected number of containers are stacked together, they are automatically moved to a packing station where they are boxed for shipment.

Whereas the invention has been described with reference to an inclined plane having a flat area, it is obvious that this flat area could in some cases be eliminated, the incline consisting only of a channel portion. The elimination of the flat portion would eliminate the rolling of the articles in the plane of the belt.

Reasonable variation and modification are possible within the scope of the foregoing disclosure, the drawings, and the claims to the invention without departing from the spirit thereof.

I claim:
1. An apparatus for aligning frusto-conically shaped articles comprising
   (a) an upwardly inclined plane,
   (b) flexible conveyor belt on said inclined plane,
   (c) means for moving said flexible belt from bottom to top of said plane,
   (d) said inclined plane being at an angle with the horizontal such that said article in at least one position is unstable, the plane incline being so adjusted that the article will not slide substantially down the plane on said belt, and
   (e) channel means in said plane to cause said belt to form a U-shaped cross sectional area, said channel being so shaped as to shift the lowest point of contact of an article resting on a base far enough up the plane to cause instability of said article at said angle.

2. An apparatus according to claim 1 wherein said channel means comprises a pair of parallel walls which extend upwardly along said inclined plane and in the central portion thereof, the walls gradually extending inwardly and then outwardly to the edges of said plane.

3. An apparatus according to claim 1 wherein the angle of incline of said plane with the horizontal is between 20 and 45 degrees.

4. A method for aligning randomly oriented, frusto-conically shaped articles having an axial height to base radius ratio in the range of 0.175/1 to 3.464/1, said method comprising passing said articles up an inclined plane whose angle of incline with the horizontal is such that an article whose larger base faces up the incline will be rotated so that said larger base faces upwardly with respect to the inclined plane or down the inclined plane, passing said article through a U-shaped channel zone on said inclined plane in which channel zone said article is supported at the outer portions of either of the smaller or larger bases thereby changing the point of support on said article so that an unbalanced moment is produced on said article to such an extent that said article is unstable on either of said bases.

5. A method according to claim 4 wherein said article is a container.

6. A method according to claim 4 wherein said angle of incline is between 5 and 60°.

7. A method for orienting an article whose center of mass is not in the geometric center of said article, said article having at least two circular bases and an axial height to base radius ratio in the range of 0.175/1 to 3.464/1, said method comprising passing said article upwardly on an inclined plane, changing the support for said article on said inclined plane so that the article is supported at substantially only two points, and adjusting the angle of said inclined plane with the horizontal such that said article is unstable in a first position and stable in a second position.

References Cited

FOREIGN PATENTS 1,065,789  1/1954  France.

RICHARD E. AEGERTER, *Primary Examiner.*